United States Patent
Marking et al.

(10) Patent No.: US 8,070,985 B2
(45) Date of Patent: Dec. 6, 2011

(54) METHOD OF MAKING A LEAD-ACTIVATED STRONTIUM HEXABORATE PHOSPHOR

(75) Inventors: Gregory A. Marking, Sayre, PA (US); Eric R. Mercer, Versailles, KY (US); Chad E. DeForest, Milan, PA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 423 days.

(21) Appl. No.: 12/476,471

(22) Filed: Jun. 2, 2009

(65) Prior Publication Data

US 2009/0309067 A1    Dec. 17, 2009

Related U.S. Application Data

(60) Provisional application No. 61/061,672, filed on Jun. 16, 2008.

(51) Int. Cl.
*C09K 11/63* (2006.01)
*C09K 11/55* (2006.01)
(52) U.S. Cl. .................................................. 252/301.4 R
(58) Field of Classification Search ............ 252/301.4 R
See application file for complete search history.

*Primary Examiner* — Carol M Koslow
(74) *Attorney, Agent, or Firm* — Robert F. Clark

(57) ABSTRACT

There is provided a method of making a $SrB_6O_{10}$:Pb phosphor that increases the manufactured quantity of the $SrB_6O_{10}$:Pb phosphor by approximately seven fold when using the same size reaction vessel, decreases the lead-containing waste stream, and eliminates the use of hazardous concentrated ammonium hydroxide. The UV emission brightness is equivalent to or better than the same phosphor when prepared using prior methods.

7 Claims, No Drawings

METHOD OF MAKING A LEAD-ACTIVATED STRONTIUM HEXABORATE PHOSPHOR

CROSS REFERENCE TO RELATED APPLICATIONS

This application claims the benefit of U.S. Provisional Application No. 61/061,672, filed Jun. 16, 2008.

TECHNICAL FIELD

This invention relates to the manufacture of lead-activated strontium hexaborate, $SrB_6O_{10}$:Pb, for use as an ultraviolet (UV-B) emitting phosphor in fluorescent lamps.

BACKGROUND OF THE INVENTION

The UV-B emitting phosphor, $SrB_6O_{10}$:Pb, is in certain respects a better phosphor than the $Sr(Al,Mg)_{12}O_{19}$:Ce phosphor used in suntan lamps as a minor component to increase the tanning efficiency of such lamps and reduce the time needed to obtain a tan. The $SrB_6O_{10}$:Pb phosphor has a higher energy, shorter wavelength UV-B emission than the $Sr(Al,Mg)_{12}O_{19}$:Ce phosphor and is also excited better by the 185 nm radiation found in low-pressure mercury fluorescent lamps. The $Sr(Al,Mg)_{12}O_{19}$:Ce phosphor has a broad band emission centered approximately at 307 nm, while the $SrB_6O_{10}$:Pb phosphor has a narrower, but more intense, emission band centered at 302 nm.

Unfortunately, the $SrB_6O_{10}$:Pb phosphor is somewhat difficult to manufacture. In particular, the conventional process utilizes large amounts of ammonium hydroxide and produces a lead-containing waste. It would therefore be an advantage if the $SrB_6O_{10}$:Pb phosphor could be manufactured in a way that would avoid the use of ammonium hydroxide and reduce the amount of lead-containing waste.

SUMMARY OF THE INVENTION

It is an object of the invention to obviate the disadvantages of the prior art.

It is another object of the invention to provide an improved method of making a $SrB_6O_{10}$:Pb phosphor.

In accordance with an object of the invention, there is provided a method of making a $SrB_6O_{10}$:Pb phosphor that comprises the steps of:
(a) forming a slurry of boric acid and water;
(b) adding a mixture of strontium carbonate and lead oxide to the slurry;
(c) heating and digesting the slurry for a period of time to obtain a precipitate;
(d) drying the precipitate; and
(e) firing the precipitate to form the phosphor.

Preferably, the slurry is heated to about 90° C. and digested for about 2 hours.

In a preferred embodiment, the precipitate is mixed with silica prior to firing and the phosphor after firing is washed and decanted with water to remove silica and then washed with a basic solution of strontium hydroxide to remove residual boric acid.

Compared to prior methods, the present method increases the manufactured quantity of the $SrB_6O_{10}$:Pb phosphor by approximately seven fold when using the same size reaction vessel, decreases the lead waste stream, and eliminates the use of hazardous concentrated ammonium hydroxide. The UV emission brightness is equivalent or better than phosphor prepared using prior methods.

DETAILED DESCRIPTION OF THE INVENTION

For a better understanding of the present invention, together with other and further objects, advantages and capabilities thereof, reference is made to the following disclosure and appended claims.

I. Precipitation Stage

COMPARATIVE EXAMPLE

Twenty gallons water of hot de-ionized (DI) water is added to a tank, heated to 70° C., and 5.16 pounds of strontium nitrate, $Sr(NO_3)_2$, 153 grams of lead nitrate, $Pb(NO_3)_2$, and 10.72 pounds of boric acid, $H_3BO_3$ is added. Heating at 70° C. is continued while agitating until all material is dissolved and solution becomes clear. The tank is then heated to 91° C. and quickly (10 seconds maximum) 10 gallons of reagent grade ammonium hydroxide, $NH_4OH$, is added to the tank. The resulting precipitate is digested for 20 minutes at 91-93° C. The agitation is turned off and the precipitate allowed to settle for 4 hours while continuing to heat. After settling, the heat is turned off, the mother liquor decanted, and the precipitate washed once with hot de-ionized water and agitated for 5 minutes. The precipitate is settled, the wash liquid decanted, and the material transferred to a crock for further dewatering. The precipitate material is dried 16 hours at 150° F., 6 hours at 250° F., and 12 hours at 350° F., sifted −20 mesh with a nylon screen, drum blended for 1 hour, and is ready to fire at this point.

INVENTIVE EXAMPLE

Thoroughly blend 11.41 kg hammermilled strontium carbonate, $SrCO_3$, together with 307.3 grams leads oxide, PbO, which has been sifted —60 mesh. Fill a steam jacketed tank with 20 gallons of hot deionized water, add 29.73 kg boric acid, $H_3BO_3$, agitate and heat to 90° C. Add the $SrCO_3$/PbO mixture as fast as possible to boric acid slurry while agitating. Maintain water level and temperature at 90° C. for 2 hours of digestion while stirring. After 2 hours digestion, cool tank and reduce water temperature while stirring. When the slurry temperature is <50° C., transfer precipitate to a crock and leave covered overnight. The precipitate material is then broken into chunks of approximately 1-2 inches, dried 16 hours at 150° F., 6 hours at 250° F., and 12 hours at 350° F., hammermilled, drum blended for 1 hour, and is ready to fire at this point.

Table 1 below lists the moles and metric weights of the raw materials and the calculated amounts of $SrB_6O_{10} \cdot 5H_2O$ precipitate produced by each method. The comparative method used 0.042 moles of $Pb^{2+}$ activator per formula unit, while the present method uses only 0.018 moles of $Pb^{2+}$ activator per formula unit. Despite the lower amount of lead used in the process, the brightness of the finished phosphor is equivalent to the phosphor produced from the precipitate of the comparative example.

TABLE 1

| Moles and Metric Weights in Same Size Tank | | |
|---|---|---|
| | Comparative Example | Inventive Example |
| DI Water | 20 gallons | 20 gallons |
| $Sr(NO_3)_2$ | 11.06 moles | — |
| | 2.340 kilograms | |
| $SrCO_3$ | — | 77.29 moles |
| | | 11.41 kilograms |

TABLE 1-continued

Moles and Metric Weights in Same Size Tank

|  | Comparative Example | Inventive Example |
| --- | --- | --- |
| $Pb(NO_3)_2$ | 0.462 moles | — |
|  | 0.153 kilograms |  |
| PbO | — | 1.377 moles |
|  |  | 0.3073 kilograms |
| $H_3BO_3$ | 78.64 moles | 480.82 moles |
|  | 4.863 kilograms | 29.73 kilograms |
| $NH_4OH$ | 10 gallons | — |
| $SrB_6O_{10} \cdot 5H_2O$ product | <11.52 moles | 78.66 moles |
|  | <4.67 kilograms | 31.86 kilograms |

II. Firing and Finishing Stages

One drawback of the precipitation stage of the present method is that it results in highly sintered cakes after firing. In order to reduce labor-intensive processing of the sintered cakes, the precipitate is first thoroughly mixed with 6 weight percent (wt %) fumed silica (screened −60 mesh) and then fired in 6"×6"×4" silica boats for approximately 2.5 hours at 830° C. (1525° F.) under an air atmosphere in a continuous furnace. With the silica addition, the resulting fired cakes are quite soft and can easily be hammermilled to comminute them. The silica does not react with the $SrB_6O_{10}$:Pb phosphor at this temperature and most can be removed through a washing and decanting procedure. The fired $SrB_6O_{10}$:Pb/silica mixture is agitated in cold de-ionized water for 10 minutes and then allowed to settle. The fumed silica has a very small particle size and remains in suspension when the bulk of the phosphor settles and can be removed through decantation. This washing and decantation is performed 3 or 4 times in cold water as quickly as possible until suspended silica is no longer observed. After the final water wash, the phosphor is quickly wet milled to further break the particles apart and then water washed one more time to remove additional silica. The milled phosphor is then transferred to a tank and agitated for approximately 2 hours in a $Sr(OH)_2$ solution with a pH of 10.0-10.2 to remove any residual boric acid. After a thorough agitation in the $Sr(OH)_2$ solution, the phosphor is allowed to settle, the $Sr(OH)_2$ solution decanted, and the phosphor powder is washed as briefly as possible in cold de-ionized water twice to remove residual $Sr(OH)_2$. The phosphor is then filtered and dried. Although a small amount of silica is detectable in the finished phosphor, the brightness of the phosphor is equivalent to the phosphor made without silica.

While there have been shown and described what are at present considered to be preferred embodiments of the invention, it will be apparent to those skilled in the art that various changes and modifications can be made herein without departing from the scope of the invention as defined by the appended claims.

We claim:

1. A method of making a $SrB_6O_{10}$:Pb phosphor comprising the steps of:
    (a) forming a slurry of boric acid and water;
    (b) adding a mixture of strontium carbonate and lead oxide to the slurry;
    (c) heating and digesting the slurry for a period of time to obtain a precipitate;
    (d) drying the precipitate; and
    (e) firing the precipitate to form the phosphor.

2. The method of claim 1 wherein the precipitate is mixed with silica prior to firing and the phosphor after firing is washed and decanted with water to remove silica and then washed with a basic solution of strontium hydroxide to remove residual boric acid.

3. The method of claim 1 wherein the slurry is heated to about 90° C. and digested for about 2 hours.

4. The method of claim 1 wherein the mixture of strontium carbonate and lead oxide is added quickly to the slurry.

5. The method of claim 1 wherein the precipitate may be represented by a formula $SrB_6O_{10} \cdot 5H_2O$.

6. The method of claim 5 wherein the precipitate contains 0.018 moles of $Pb^{2+}$ activator per formula unit.

7. A method of making a $SrB_6O_{10}$:Pb phosphor comprising the steps of:
    (a) forming a slurry of boric acid and water;
    (b) quickly adding a mixture of strontium carbonate and lead oxide to the slurry;
    (c) heating and digesting the slurry for a period of time to obtain a $SrB_6O_{10} \cdot 5H_2O$ precipitate;
    (d) drying the precipitate; and
    (e) firing the precipitate in air to form the phosphor.

* * * * *